(12) United States Patent
Chan et al.

(10) Patent No.: US 11,934,523 B1
(45) Date of Patent: Mar. 19, 2024

(54) SYSTEM AND METHOD FOR SECURING DATA FILES

(71) Applicant: FLEXXON PTE. LTD., Singapore (SG)

(72) Inventors: Mei Ling Chan, Singapore (SG); Hong Chuan Tan, Singapore (SG)

(73) Assignee: FLEXXON PTE. LTD., Singapore (SG)

( * ) Notice: Subject to any disclaimer, the term of this patent is extended or adjusted under 35 U.S.C. 154(b) by 0 days.

(21) Appl. No.: 18/111,096

(22) Filed: Feb. 17, 2023

(30) Foreign Application Priority Data

Dec. 1, 2022 (SG) .......................... 10202260284Y

(51) Int. Cl.
*G06F 21/56* (2013.01)
*G06F 21/62* (2013.01)
*G06N 3/084* (2023.01)

(52) U.S. Cl.
CPC ........ *G06F 21/565* (2013.01); *G06F 21/6218* (2013.01); *G06N 3/084* (2013.01); *G06F 2221/034* (2013.01)

(58) Field of Classification Search
CPC .............. G06F 21/565; G06F 21/6218; G06F 2221/034; G06N 3/084
See application file for complete search history.

(56) References Cited

U.S. PATENT DOCUMENTS

| | | | | |
|---|---|---|---|---|
| 4,295,218 A * | 10/1981 | Tanner | ............... | H03M 13/1111 714/788 |
| 10,505,973 B2 * | 12/2019 | Kupreev | ............... | H04L 63/145 |
| 11,683,377 B1 * | 6/2023 | Margolin | ............... | H04L 41/145 709/201 |
| 2019/0108338 A1 | 4/2019 | Saxe et al. | | |
| 2019/0163904 A1 | 5/2019 | Chung et al. | | |
| 2019/0334834 A1 | 10/2019 | Yu et al. | | |
| 2020/0076841 A1 * | 3/2020 | Hajimirsadeghi | .. | H04L 63/1408 |
| 2020/0220715 A1 * | 7/2020 | Fiske | ....................... | H04L 9/14 |
| 2020/0250309 A1 * | 8/2020 | Harang | ................... | G06F 18/21 |

(Continued)

FOREIGN PATENT DOCUMENTS

| | | |
|---|---|---|
| CN | 108063754 A | 5/2018 |
| CN | 112737107 A | 4/2021 |
| CN | 115001781 A | 9/2022 |

OTHER PUBLICATIONS

Search Report and Written Opinion of Singaporean Application No. 10202260284Y dated Feb. 17, 2023.

(Continued)

*Primary Examiner* — Meng Li
(74) *Attorney, Agent, or Firm* — Burns & Levinson LLP; Steven M. Mills

(57) ABSTRACT

This document discloses a system and method for securing data files selected from a series of data files. The system comprises a transformation module, an artificial neural network (ANN), a clustering module and a backpropagation module whereby these modules are configured to identify data files that contain malware or anomalies. When such data files are detected, the system will then initiate a series of measures to identify other data files that may be similarly afflicted by the detected malware. These data files are then secured to prevent the malware from affecting a host machine and/or any storage/peripheral devices linked to the host machine.

14 Claims, 4 Drawing Sheets

(56) References Cited

U.S. PATENT DOCUMENTS

| | | | |
|---|---|---|---|
| 2020/0322146 A1* | 10/2020 | Fiske | H04L 9/006 |
| 2021/0365539 A1* | 11/2021 | Fiske | H04L 9/3066 |
| 2021/0391939 A1* | 12/2021 | Lamas-Linares | H04L 63/1425 |
| 2022/0014542 A1* | 1/2022 | Janakiraman | H04L 63/1433 |
| 2022/0335137 A1* | 10/2022 | Canada | G06F 21/52 |
| 2022/0398472 A1* | 12/2022 | White | G06N 5/045 |
| 2023/0035666 A1* | 2/2023 | Bilenko | G06N 3/084 |
| 2023/0229537 A1* | 7/2023 | Harutyunyan | G06N 5/022 |
| | | | 714/26 |

OTHER PUBLICATIONS

Yang et al., "On Optimal PMU Placement-Based Defense Against Data Integrity Attacks in Smart Grid," IEEE Transactions on Information Forensics and Security, vol. 12, No. 7, pp. 1735-1750, 2017.

Extended European Search Report of EP Application No. 23186088.3, dated Dec. 1, 2023.

Notice of Allowance of TW Application No. 112126923, dated Nov. 29, 2023.

* cited by examiner

SYSTEM AND METHOD FOR SECURING DATA FILES

CROSS-REFERENCE TO RELATED APPLICATIONS

This application claims the benefit of priority under 35 U.S.C. § 119 to SG Application No. 10202260284Y, filed Dec. 1, 2022, which is incorporated herein by reference in its entirety.

FIELD OF THE INVENTION

This invention relates to a system and method for securing data files selected from a series of data files. The system comprises a transformation module, an artificial neural network (ANN), a clustering module, and a backpropagation module whereby these modules are configured to identify data files that contain malware or anomalies. When such data files are detected, the system will then initiate a series of measures to identify other data files that may be similarly afflicted by the detected malware. These data files are then secured to prevent the malware from affecting a host machine and/or any storage/peripheral devices linked to the host machine.

SUMMARY OF PRIOR ART

Malware is a constant threat in the modern-day computing landscape. As more and more computing devices are connected through wireless or wired networks, malware may spread easily through the network, infecting all connected computing devices. Infected computers will reduce the productivity of individuals and organizations, and additionally may cause irreparable harm. For example, infected computers may have damaged operating systems or corrupted data, making them slower, or rendering them completely non-functional. In a worst-case scenario, valuable data and information may be misappropriated, hijacked, and used or ransomed. Additionally, such infected systems may continue to spread the malware to other devices outside of their network.

Conventional anti-malware software may attempt to identify and detect known malware by detecting the signatures of these known malware or finding patterns within programs that are associated with other known malware. Such anti-malware methods work based on a signature-based detection system, which compares executables and data to patterns of known malware. However, zero-day exploits/attacks will typically not be a fit with any pattern of known malware. Consequently, existing anti-malware solutions may fail to detect zero-day exploits, which are unpredictably different from known malware.

As mentioned above, valuable data and information may be misappropriated by malware and such data are often irreplaceable. Hence, precautionary measures are often taken such as backing up the data frequently or encrypting and storing the encrypted data in a secure environment.

Unfortunately, such measures face many issues as the backed-up data may be hacked or corrupted, there may be hardware failures, accidental damage, ransomware or malware infections or accidental deletions. In the case of ransomware, the attacker will encrypt the user's file and demand a ransom from the victim to restore access to the data. Generally, in such types of attacks, there are number of vectors that had to be compromised. One of the most common being phishing spam. In a phishing spam, a corrupted attachment is downloaded and executed by the unsuspecting user. Once these files are executed, they then proceed to take control of the device's operating system by self-installing relevant scripts and by corrupting data contained therein.

Some forms of malicious scripts do not need to be executed by the user. Such scripts can inflict damage to the computing device by exploiting security vulnerabilities in the operating system to infect files and data contained therein. Additionally, there are also cyber-attacks known as leak-ware and dox-ware. In such attacks, a malicious actor who has gained access to a computing device will threaten to publicize sensitive data contained in the computing device's storage media.

Malicious third parties may also employ Trojan attacks to disrupt, damage and steal a user's data. Trojans also give rise to virus, worms, spyware, zombies, botnet, logic bombs and trap doors. In general, all these various types of malicious cyberattacks have the single aim of compromising the security of a user's data. These attacks usually corrupt the operating system and kernel layers of the operating system along with the address pointers in which the data are stored thereby corrupting the data itself.

For the above reasons, those skilled in the art are constantly striving to come up with a system and method that is capable of securing files in a computing device by identifying and detecting data files that may contain malware.

SUMMARY OF THE INVENTION

The above and other problems are solved and an advance in the art is made by systems and methods provided by embodiments in accordance with the invention.

A first advantage of embodiments of systems and methods in accordance with the invention is that the system is configured to secure all types of files, regardless of whether the files are executable or non-executable.

A second advantage of embodiments of systems and methods in accordance with the invention is that the system is configured to store the data files in a format that is difficult to be manipulated and reconstructed by unauthorized users, even though if the host computing device's operating system has been compromised.

A third advantage of embodiments of systems and methods in accordance with the invention is that once the files have been stored in accordance with embodiments of the invention, the system is able to recover corrupted files easily and efficiently through the use of a mapping function that was used to map the RREF matrices to the stored files.

A fourth advantage of embodiments of systems and methods in accordance with the invention is that the system is configured to detect malware and zero-day type malware contained within the data files as the files are transformed into a numeric representation before the files are analysed using a trained neural network.

A fifth advantage of embodiments of systems and methods in accordance with the invention is that the system is configured to store files that are determined to contain malware in a virtual secure area in the memory whereby the stored files may only be retrieved by authorized users.

The above advantages are provided by embodiments of a system and/or method in accordance with the invention operating in the following manner.

According to a first aspect of the invention, a system for securing a series of data files is disclosed, the system comprising: a transformation module comprising sets of reduced row echelon form (RREF) matrices that have been transformed from the series of data files, whereby the series of data files have been mapped to the sets of RREF matrices, the transformation module being configured to: retrieve an altered data file from the system and transform the altered data file into an altered set of RREF matrices; map the altered data file to the altered set of RREF matrices, and provide the altered set of RREF matrices to a trained artificial neural network (ANN) module; the trained ANN module configured to: determine if the altered set of RREF matrices comprise malicious activity, whereby when it is determined that the altered set of RREF matrices comprise malicious activity, the altered set of RREF matrices and the altered data file are moved to a virtual secure area in a memory of the system; a clustering module configured to: retrieve, using a backpropagation module, variations of the altered set of RREF matrices from the sets of RREF matrices; cluster the retrieved variations of the altered set of RREF matrices and the altered set of RREF matrices to identify sets of RREF matrices that contain malicious activity; provide the identified sets of RREF matrices that contain malicious activity to the trained ANN module, whereby the trained ANN module is configured to identify a type of malicious activity associated with the identified sets of RREF matrices; and secure data files mapped to the identified sets of RREF matrices that contain malicious activity according to the type of malicious activity associated with the data files as identified by the trained ANN module.

In accordance with embodiments of the first aspect of the invention, the transformation of the altered data file into the altered set of RREF matrices by the transformation module comprises the transformation module being configured to: convert the altered data file into an intermediate data frame, wherein the intermediate data frame comprises a multimedia data frame or a character-based data frame; transform the intermediate data frame into a set of matrices using a first linear function; and transform the set of matrices into the altered set of RREF matrices.

In accordance with embodiments of the first aspect of the invention, the clustering module is further configured to provide sets of RREF matrices that do not contain malicious activity to the transformation module, whereby the transformation module is further configured to convert the provided sets of RREF matrices into data files, and map the data files to the provided sets of RREF matrices.

In accordance with embodiments of the first aspect of the invention, the variations of the altered set of RREF matrices comprise related sets of RREF matrices that have differing timestamps.

In accordance with embodiments of the first aspect of the invention, the mapping of the series of data files to the sets of RREF matrices, and the mapping of the altered data file to the altered set of RREF matrices is done for each data file or each altered data file by applying a hashing function to an address of the data file and to a contextual metadata layer of the data file, and using the result of this hashing function to link each data file to each sets of RREF matrices.

In accordance with embodiments of the first aspect of the invention, the trained ANN module is further configured to further train the neural network in the ANN module based on the identified sets of RREF matrices that contain malicious activity.

In accordance with embodiments of the first aspect of the invention, the transformation of the series of data files into the sets of RREF matrices by the transformation module comprises the transformation module being configured to: convert each of the data files into an intermediate data frame, wherein the intermediate data frame comprises a multimedia data frame or a character-based data frame; transform the intermediate data frame into a set of matrices using a first linear function; and transform the set of matrices into a set of RREF matrices.

According to a second aspect of the invention, a method for securing a series of data files using a system comprising a transformation module that comprises sets of reduced row echelon form (RREF) matrices that have been transformed from the series of data files, whereby the series of data files have been mapped to the sets of RREF matrices is disclosed, the method comprising the steps of: retrieving, using the transformation module, an altered data file from the system and transforming the altered data file into an altered set of RREF matrices; mapping, using the transformation module, the altered data file to the altered set of RREF matrices, and providing the altered set of RREF matrices to a trained artificial neural network (ANN) module; determining, using the trained ANN module, if the altered set of RREF matrices comprise malicious activity, whereby when it is determined that the altered set of RREF matrices comprise malicious activity, the altered set of RREF matrices and the altered data file are moved to a virtual secure area in a memory of the system; retrieving, using a backpropagation module, variations of the altered set of RREF matrices from the sets of RREF matrices; clustering, using a clustering module, the retrieved variations of the altered set of RREF matrices and the altered set of RREF matrices to identify sets of RREF matrices that contain malicious activity; providing, using the clustering module, the identified sets of RREF matrices that contain malicious activity to the trained ANN module, whereby the trained ANN module is configured to identify a type of malicious activity associated with the identified sets of RREF matrices; and securing, using the clustering module, data files mapped to the identified sets of RREF matrices that contain malicious activity according to the type of malicious activity associated with the data files as identified by the trained ANN module.

In accordance with embodiments of the second aspect of the invention, the transforming of the altered data file into the altered set of RREF matrices comprises: converting, using the transformation module, the altered data file into an intermediate data frame, wherein the intermediate data frame comprises a multimedia data frame or a character-based data frame; transforming, using the transformation module, the intermediate data frame into a set of matrices using a first linear function; and transforming, using the transformation module, the set of matrices into the altered set of RREF matrices.

In accordance with embodiments of the second aspect of the invention, the method further comprises the step of: providing, using the clustering module, sets of RREF matrices that do not contain malicious activity to the transformation module, whereby the transformation module is further configured to convert the provided sets of RREF matrices into data files, and map the data files to the provided sets of RREF matrices.

In accordance with embodiments of the second aspect of the invention, the variations of the altered set of RREF matrices comprise related sets of RREF matrices that have differing timestamps.

In accordance with embodiments of the second aspect of the invention, the mapping of the series of data files to the sets of RREF matrices, and the mapping of the altered data file to the altered set of RREF matrices is done for each data file or each altered data file by applying a hashing function to an address of the data file and to a contextual metadata layer of the data file, and using the result of this hashing function to link each data file to each sets of RREF matrices.

In accordance with embodiments of the second aspect of the invention, the method further comprises the step of training the neural network in the ANN module based on the identified sets of RREF matrices that contain malicious activity.

In accordance with embodiments of the second aspect of the invention, the transforming of the series of data files into the sets of RREF matrices by the transformation module comprises the steps of: converting, using the transformation module, each of the data files into an intermediate data frame, wherein the intermediate data frame comprises a multimedia data frame or a character-based data frame; transforming, using the transformation module, the intermediate data frame into a set of matrices using a first linear function; and transforming, using the transformation module, the set of matrices into a set of RREF matrices.

BRIEF DESCRIPTION OF THE DRAWINGS

The above and other problems are solved by features and advantages of a system and method in accordance with the present invention described in the detailed description and shown in the following drawings.

DETAILED DESCRIPTION

Figure 1:
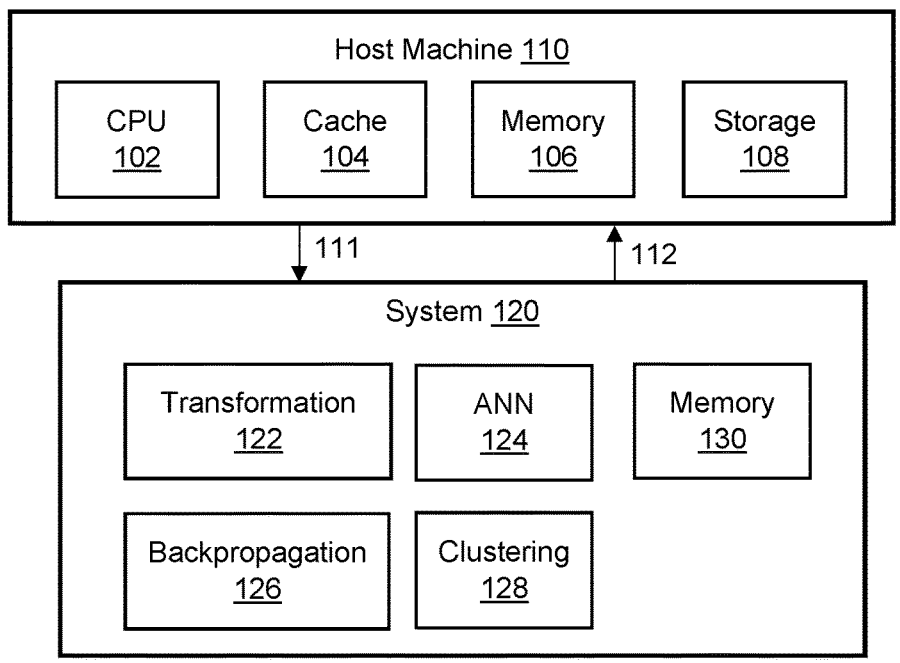
FIG. 1 illustrating a block diagram of a system for securing data files from a host machine in accordance with embodiments of the invention.

This invention relates to a system and method for securing data files selected from a series of data files. The system comprises a transformation module, an artificial neural network (ANN), a clustering module and a backpropagation module and these modules are configured to identify data files that contain malware or anomalies. When such data files are detected, the system will then initiate a series of measures to identify other data files that may be similarly afflicted by the detected malware. These data files are then secured to prevent the malware from affecting a host machine and/or any storage/peripheral devices linked to the host machine.

In particular, a transformation module comprising sets of reduced row echelon form (RREF) matrices that have been transformed from the series of data files, whereby the series of data files have been mapped to the sets of RREF matrices is, configured to: retrieve an altered data file from the system and transform the altered data file into an altered set of RREF matrices. The altered data file is then mapped to the altered set of RREF matrices, and this is then provided to a trained artificial neural network (ANN) module. Upon receiving the altered set of RREF matrices, the trained ANN module is then configured to determine if the altered set of RREF matrices comprise malicious activity, whereby when it is determined that the altered set of RREF matrices comprise malicious activity, the altered set of RREF matrices and the altered data file are moved to a virtual secure area in a memory of the system. A clustering module then retrieves, using a backpropagation module, variations of the altered set of RREF matrices from the sets of RREF matrices and then proceeds to cluster the retrieved variations of the altered set of RREF matrices and the altered set of RREF matrices in the secure area to identify sets of RREF matrices that contain malicious activity. Once identified, the identified sets of RREF matrices that contain malicious activity are then provided to the trained ANN module and data files mapped to the identified sets of RREF matrices that contain malicious activity will be secured.

The present invention will now be described in detail with reference to several embodiments thereof as illustrated in the accompanying drawings. In the following description, numerous specific features are set forth in order to provide a thorough understanding of the embodiments of the present invention. It will be apparent, however, to one skilled in the art, that embodiments may be realised without some or all of the specific features. Such embodiments should also fall within the scope of the current invention. Further, certain process steps and/or structures in the following may not been described in detail and the reader will be referred to a corresponding citation so as to not obscure the present invention unnecessarily.

Further, one skilled in the art will recognize that many functional units in this description have been labelled as modules throughout the specification. The person skilled in the art will also recognize that a module may be implemented as circuits, logic chips or any sort of discrete component. Still further, one skilled in the art will also recognize that a module may be implemented in software which may then be executed by a variety of processor architectures. In embodiments of the invention, a module may also comprise computer instructions, firmware or executable code that may instruct a computer processor to carry out a sequence of events based on instructions received. The choice of the implementation of the modules is left as a design choice to a person skilled in the art and does not limit the scope of this invention in any way.

An exemplary process or method for securing data files in accordance with embodiments of the invention is set out in the steps below.

Step 1: retrieve, using a transformation module, an altered data file from the system and transform the altered data file into an altered set of RREF matrices; map the altered data file to the altered set of RREF matrices, and provide the altered set of RREF matrices to a trained artificial neural network (ANN) module, whereby the transformation module comprises sets of reduced row echelon form (RREF) matrices that have been transformed from the series of data files, and whereby the series of data files have been mapped to the sets of RREF matrices, Step 2: determine, using the trained ANN module, if the altered set of RREF matrices comprise malicious activity, whereby when it is determined that the altered set of RREF matrices comprise malicious activity, the altered set of RREF matrices and the altered data file are moved to a virtual secure area in a memory of the system, Step 3: retrieve, using a backpropagation module, variations of the altered set of RREF matrices from the sets of RREF matrices, Step 4: cluster, using a clustering module, the retrieved variations of the altered set of RREF matrices and the altered set of RREF matrices to identify sets of RREF matrices that contain malicious activity, and Step 5: provide, using the clustering module, the identified sets of RREF matrices that contain malicious activity to the trained ANN module, and secure data files mapped to the identified sets of RREF matrices that contain malicious activity.

In accordance with embodiments of the invention, the steps set out above may be carried out or executed by a system or a hardware module (comprising sub-modules) that is communicatively connected to a host machine. The steps above may also be carried out or executed by a software module provided either at the host machine and/or at a connected peripheral device.

A block diagram of a system for securing data files in a host machine in accordance with embodiments of the invention is illustrated in FIG. 1.

FIG. 1 illustrates host machine 110 which generally may comprise any hardware device that has CPU 102, cache 104, memory 106 and/or storage 108. Some examples of host machines include, but are not limited to, computers, personal electronic devices, thin clients, and multi-functional devices. In particular, almost any kind of computer, including a centralized mainframe, a server or a desktop personal computer (PC) may be configured as a host machine.

CPU 102 may comprise any device or component that can process such instructions and may include: a microprocessor, microcontroller (MCU), programmable logic device or other computational device. That is, CPU 102 may be provided by any suitable logic circuitry for receiving inputs, processing them in accordance with instructions stored in memory 106 and generating outputs and may comprise a single core or multi-core processor with memory addressable space. Additionally, memory 106 may comprise volatile and non-volatile memory, and storage 108 may comprise (but is not limited to) solid state devices (SSDs), hard disk drives (HDDs), optical drives, or magnetic disc drives.

Host machine 110 is communicatively connected to system 120 through an I/O hub (not shown) which may comprise, but is not limited to, any type of microchip that may be used to manage data communications between CPU 102 and the various electronic components in host machine 110 and to manage data that is to be exchanged between host machine 110 and system 120.

System 120 comprises transformation module 122 that is configured to transform data files into reduced row echelon form (RREF) matrices and to reconstruct RREF matrices back to data files, artificial neural network (ANN) module 124 that comprises a trained neural network, memory 130 that comprise secure and unsecure volatile and non-volatile memories, backpropagation module 126 that is configured to identify variations of data files and/or sets of RREF matrices and clustering module 128 that is configured to cluster RREF matrices to generate clusters of RREF matrices to identify clusters of RREF matrices that may contain malicious activity. One skilled in the art will recognize that system 120 may comprise other types of additional modules and/or components without departing from the invention.

In accordance with embodiments of the invention, during an initial setup stage, system 120 will obtain the entire series, parts of the entire series, or selected portions of data files 111 from host machine 110, and data files 111 may comprise, but are not limited to, any type of files that may be stored within memory 106 or storage 108, or any files that may be internally communicated between or executed by the modules of host machine 110. Checksums will then be extracted from the data files that have checksums and this information is then stored in memory 130 of system 120 for future use.

Under the assumption that the entire series of data files 111 are obtained from host machine 110, system 120 then proceeds to bind various permission and user settings to each of data files 111. These settings are essential as the metadata associated with each of the data files may contain information relating to the authenticity of the bound files. Further, this metadata may be used as authentication means, e.g., an authentication certificate such as a .PEM file, for internal validation processes.

Transformation module 122 then proceeds to convert each of the data files (which may comprise a data file bound with permission and user settings or may comprise an unbound data file). Each data file is first converted into an intermediate data frame so that it may subsequently be easily converted into a set of matrices. In embodiments of the invention, the intermediate data frame may comprise a multimedia data frame which comprise frames having an image file format or may comprise a character-based data frame. Given the red-green-blue (RGB) nature of multimedia data frames, converting them into numeric values becomes easier. In other embodiments of the invention, the intermediate data frame may comprise a character-based data frame instead. In further embodiments of the invention, the intermediate data frame may comprise both the multimedia and character-based data frame.

Figure 5:
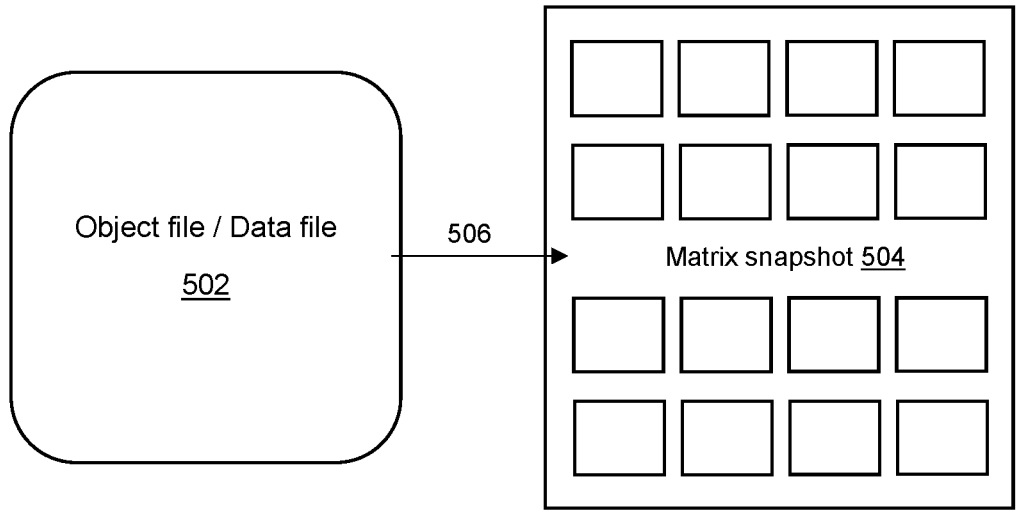
FIG. 5 illustrating a diagram showing the transformation of a data file to an intermediate data frame in accordance with embodiments of the invention.
Figure 6:
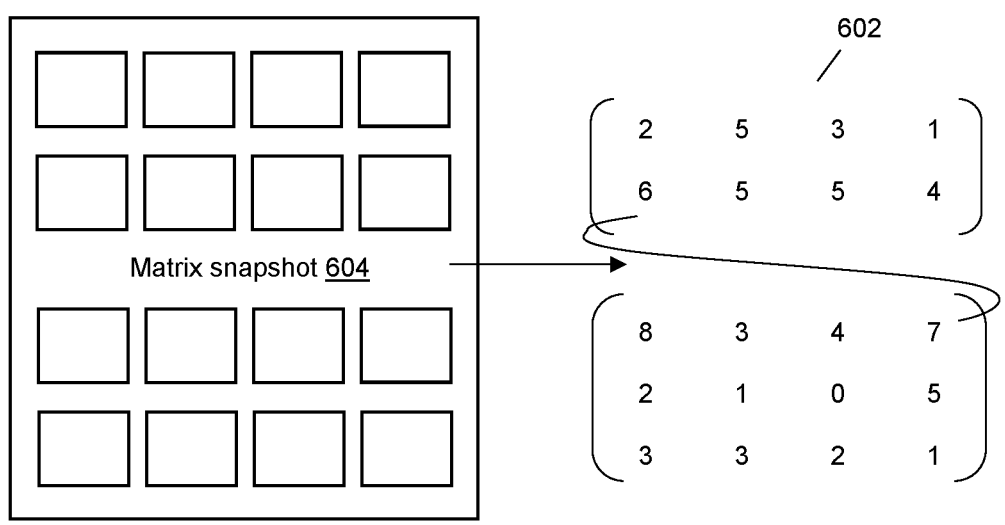
FIG. 6 illustrating a diagram showing the transformation of the intermediate file to a reduce row echelon matrix in accordance with embodiments of the invention.

The intermediate data frame, regardless whether it is a multimedia or character-based data frame is then converted into a set of matrices. This is illustrated in FIG. 5 which shows that a data file 502 is converted through a conversion process 506 to a matrix snapshot 504. FIG. 6 then illustrates the conversion of the matrix snapshot 604 to a numerical matrix representation 602. In embodiments of the invention, this conversion may be done using a predetermined look-up table whereby each alphanumeric symbol and/or character and/or pixel and/or colour in the intermediate data frame may be represented by a unique number and/or symbol. A predetermined matrix generation algorithm or function may then be used together with the look-up table to convert the intermediate data frame into sets of matrices. In other embodiments of the invention, more complex mathematical functions may be used to convert the intermediate data frames into numerical data frames and these mathematical functions may comprise functions such as shuffle, rotation, changing the order, and etc.

In a further embodiment of the invention, a partial differential equation function may be used with the numerical look-up table to derivate the data and to encrypt the data using dependent arguments. The dependent arguments may comprise the hash or the encryption keys with which the data is parameterized and segmented.

Once each of the intermediate data frames have been converted into sets of matrices, transformation module 122 then further transforms the sets of matrices (which may be represented by linear equations) to sets of reduced row echelon form (RREF) matrices and this may be done, but is not limited to, through the use of various mathematical operations. This transformative step of transforming the sets of matrices into sets of RREF matrices adds an additional layer of encryption to the data as the transformation process involves the use of linear equations which are known only to system 120. It can thereby be said that these linear equations act as unique encryption algorithms for system 120.

Once the series of data files 111 have been converted into their corresponding sets of RREF matrices by transformation module 122, each data file is then mapped to their set of RREF matrices and this may be done using, but is not limited to, a key-value pairing function or a key-value hash function. The function used to generate the pairing and the generated maps along with the set of RREF matrices are then stored safely in memory 130.

In another embodiment of the invention, a hashing function may be applied to the metadata of a datafile and/or the address of the data file. The result from the hashing function may then be used to map the data file to their corresponding set of RREF matrices. The usage of the contextual metadata layer of the data file in the hashing function adds a unique property to the mapping function as not only is the address of the data file verified, but the referenced metadata is also verified as well.

In embodiments of the invention, the hashing function may comprise a combination of natural language processing (NLP) algorithms and key-value binding functions. The NLP algorithms are configured to process the contextual metadata and semi-tags the information parametrizing them and storing them in a specific key address. This improves the search algorithm (of the mapping function) and sets the complexity value as O(1) as the task of locating the data frame comprises the system searching for the appropriate key which may be generated together with the validation of the checksum for the data file. As a result, this key may be uniquely defined within the system.

This step is important because in traditional operating systems, the data files are simply stored in the host machine's hex memory address whereby pointers are used to identify the location of the data files. If these pointers were to be corrupted by malware, this would effectively render the data files useless as they would not be able to be retrieved by the host machine. Once this is done, system 120 then continuously monitors host machine 110 for changes to the series of data files 111.

In embodiments of the invention, when system 120 detects an altered data file in host machine 110, system 120 proceeds to retrieve the altered data file from host machine 110. In embodiments of the invention, system 120 will first validate the checksums of the altered data file to determine if the altered data file had been altered by an unauthorized user. If the altered data file contains a corrupted checksum or a mismatched checksum, this altered data file is then moved into a secure area to be further processed. However, malicious third parties have since uncovered ways to alter data files while ensuring the checksum remain untouched. Hence, there is the need for the altered data file to be further processed by system 120.

Using transformation module 122, the retrieved altered data file is then transformed into an altered set of RREF matrices. In embodiments of the invention, this may be done by first converting the altered data file into an intermediate data frame before it is subsequently converted into sets of matrices as previously described. The sets of matrices are then transformed using mathematical operations into their corresponding altered sets of RREF matrices. Transformation module 122 then maps the altered data file to the altered sets of RREF matrices and stores this mapping securely in memory 130. The altered sets of RREF matrices are then provided to trained artificial neural network (ANN) module 124.

In other embodiments of the invention, it is noted that when a data file has been modified or altered, the roots of the polynomial equations used to transform the altered data file into an altered set of RREF matrices may be used to identify the numbers which are altered and/or changed in the altered set of RREF matrices. If the numbers in the altered set of RREF matrices comprise a multiplier of the root of the polynomial equations, this implies that the data file has not been corrupted. Conversely, or else it has been corrupted, if the numbers in the altered set of RREF matrices does not comprise a multiplier of the root of the polynomial equations, this implies that the data file has been corrupted.

In embodiments of the invention, the ANN may comprise a neural network having between 66 to 200 hidden layers. The ANN may be initially trained using an unsupervised learning methodology whereby the training dataset comprises sets of RREF matrices associated with known malware, breaches and/or cyberattacks, and/or sets of RREF matrices that are unaffected by malware. The sets of RREF matrices may be labelled according to their respective properties such as, but not limited to, read/write operations, metadata, access level threads, hardware unique identification IDs, memory consumed, I/O bursts, physical addresses or software checksums, along with their respective timeframes. As the ANN is trained using an unsupervised learning approach, the trained ANN will keep learning of new threats as these threats are identified. In further embodiments of the invention, the ANN may be trained to identify parameters of the sets of RREF matrices that are breaking apart due to a particular type of malicious attack. Once these parameters are identified and associated with the type of malicious attack, the trained ANN will then be able to detect such attacks in the future.

In a further embodiment of the invention, the neural architecture of the ANN was designed using training sample data of 100 significant categories of known virus or malware types. The features affected were identified based on the number of inputs nodes, the number of hidden layers, and the number of nodes in each hidden layer. The learning rate of the ANN is parametrized with a value of 0.01 at the start and then gradually increased with the batch size being 1000. The number of epochs was started at a value of 500 and it was found that the optimum results showed when a batch size of 800 and epochs of 250 were used.

Trained ANN module 124 then proceeds to use the trained ANN to determine if the altered sets of RREF matrices comprise malicious activity. If the trained ANN determines that the altered sets of RREF matrices do not comprise any malware, ANN module 124 will then cause transformation module 122 to reconstruct the altered sets of RREF matrices back to its original data file and mark it as secure. These secure data files may then be returned to host machine 110 as data files 112 and the mapping will be kept in memory 130.

In embodiments of the invention, if the trained ANN determines that the altered sets of RREF matrices comprise malicious activity, the altered sets of RREF matrices along with its mapped altered data file are then moved to a virtual secure area in memory 130. In embodiments of the invention, this virtual secure area may be a virtual sandbox in memory 130.

Clustering module 128 is then configured to use backpropagation module 126 to retrieve variations of altered sets of RREF matrices from memory 130. In embodiments of the invention, these variations may comprise altered sets of RREF matrices over a series of past timeframes or altered sets of RREF matrices that have very similar values and/or numerical arrangements.

Clustering module 128 then adds these variations of the altered sets of RREF matrices to the virtual secure area in memory 130. The variations of the altered sets of RREF matrices together with the altered sets of RREF matrices are then clustered. In embodiments of the invention, a k-means clustering function is used to cluster these RREF matrices.

Clustering module 128 then identifies sets of RREF matrices that are associated with the altered sets of RREF matrices that were found to have malicious activity. These previously unidentified sets of RREF matrices are then flagged as sets of RREF matrices that potentially may comprise malicious activity and are subsequently secured by system 120 so that they will not be inadvertently installed or executed by host machine 110. Sets of RREF matrices that are not associated with the altered sets of RREF matrices together with their corresponding mapped data files are then classified as safe files.

In embodiments of the invention, sets of RREF matrices that were found to have malicious activity are provided by clustering module 128 to trained ANN module 124. In an embodiment of the invention, this information is utilized to further train the trained ANN of ANN module 124 so that it may better understand and identify such similar malware in the future. In another embodiment of the invention, trained ANN module 124 is used to identify the types of malicious activities and/or malware associated with these sets of RREF matrices. This information is then provided to clustering module 128 so that module 128 may tailor its approach to secure the data files that correspond to these sets of RREF matrices. For example, if trained ANN module 124 identifies a previously undiscovered cluster of RREF matrices that are associated with a backdoor computing attack, trained ANN module 124 will provide this information to clustering module 128. Upon receiving this information, clustering module 128 (on its own or together with other modules of system 120) may then disable all incoming data transmissions relating to the data files associated with this cluster of RREF matrices to prevent the backdoor computing attack from ever taking place (i.e. by denying access to these files from external third parties).

In another embodiment of the invention, ANN module 124 will induce a lock key mechanism to secure the lowest bits of the RREF matrices found to be associated with malicious activity to ensure that these RREF matrices may not be easily altered by malicious third parties thereby disabling the vulnerabilities of their corresponding data files.

Figure 2:
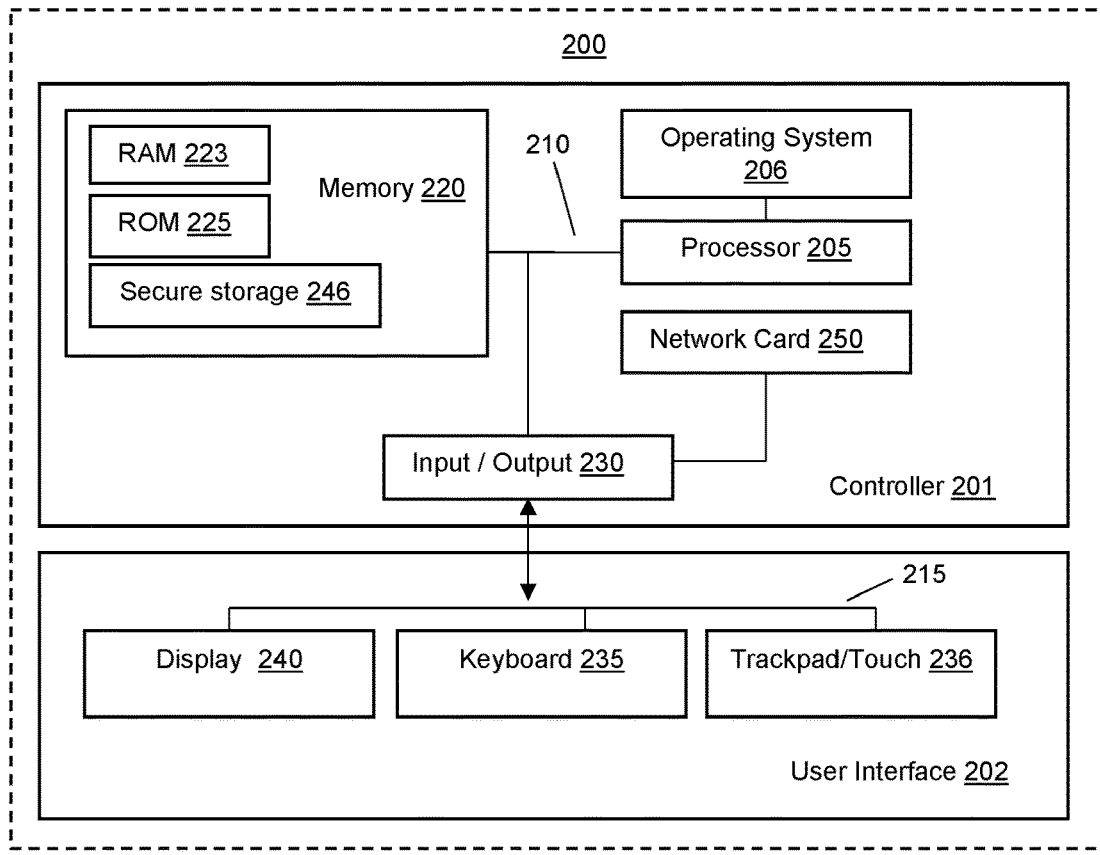
FIG. 2 illustrating a block diagram representative of components provided within a module or computing device for executing embodiments in accordance with embodiments of the invention.

In accordance with embodiments of the invention, a block diagram representative of components of processing system 200 that may be provided within any of the modules for implementing embodiments in accordance with embodiments of the invention is illustrated in FIG. 2. One skilled in the art will recognize that the exact configuration of each processing system provided within these modules may be different and the exact configuration of processing system 200 may vary and FIG. 2 is provided by way of example only.

In embodiments of the invention, each of the modules may comprise controller 201 and user interface 202. User interface 202 is arranged to enable manual interactions between a user and each of these modules as required and for this purpose includes the input/output components required for the user to enter instructions to provide updates to each of these modules. A person skilled in the art will recognize that components of user interface 202 may vary from embodiment to embodiment but may typically include one or more of display 240, keyboard 235 and trackpad 236 or conversely may not include any of these components.

Controller 201 is in data communication with user interface 202 via bus 215 and includes memory 220, processor 205 mounted on a circuit board that processes instructions and data for performing the method of this embodiment, an operating system 206, an input/output (I/O) interface 230 for communicating with user interface 202 and a communications interface, in this embodiment in the form of a network card 250. Network card 250 may, for example, be utilized to send data from these modules via a wired or wireless network to other processing devices or to receive data via the wired or wireless network. Wireless networks that may be utilized by network card 250 include, but are not limited to, Wireless-Fidelity (Wi-Fi), Bluetooth, Near Field Communication (NFC), cellular networks, satellite networks, telecommunication networks, Wide Area Networks (WAN) etc.

Memory 220 and operating system 206 are in data communication with CPU 205 via bus 210. The memory components include both volatile and non-volatile memory and more than one of each type of memory, including Random Access Memory (RAM) 223, Read Only Memory (ROM) 225 and storage memory (not shown), the last comprising one or more solid-state drives (SSDs). Memory 220 also includes secure storage 246 for securely storing secret keys, or private keys. One skilled in the art will recognize that the memory components described above comprise non-transitory computer-readable media and shall be taken to comprise all computer-readable media except for a transitory, propagating signal. Typically, the instructions are stored as program code in the memory components but can also be hardwired. Memory 220 may include a kernel and/or programming modules such as a software application that may be stored in either volatile or non-volatile memory.

Herein the term "processor" is used to refer generically to any device or component that can process such instructions and may include: a microprocessor, microcontroller, programmable logic device or other computational device. That is, processor 205 may be provided by any suitable logic circuitry for receiving inputs, processing them in accordance with instructions stored in memory and generating outputs (for example to the memory components or on display 240). In this embodiment, processor 205 may be a single core or multi-core processor with memory addressable space. In one example, processor 205 may be multi-core, comprising—for example—an 8 core CPU. In another example, it could be a cluster of CPU cores operating in parallel to accelerate computations.

Figure 3:
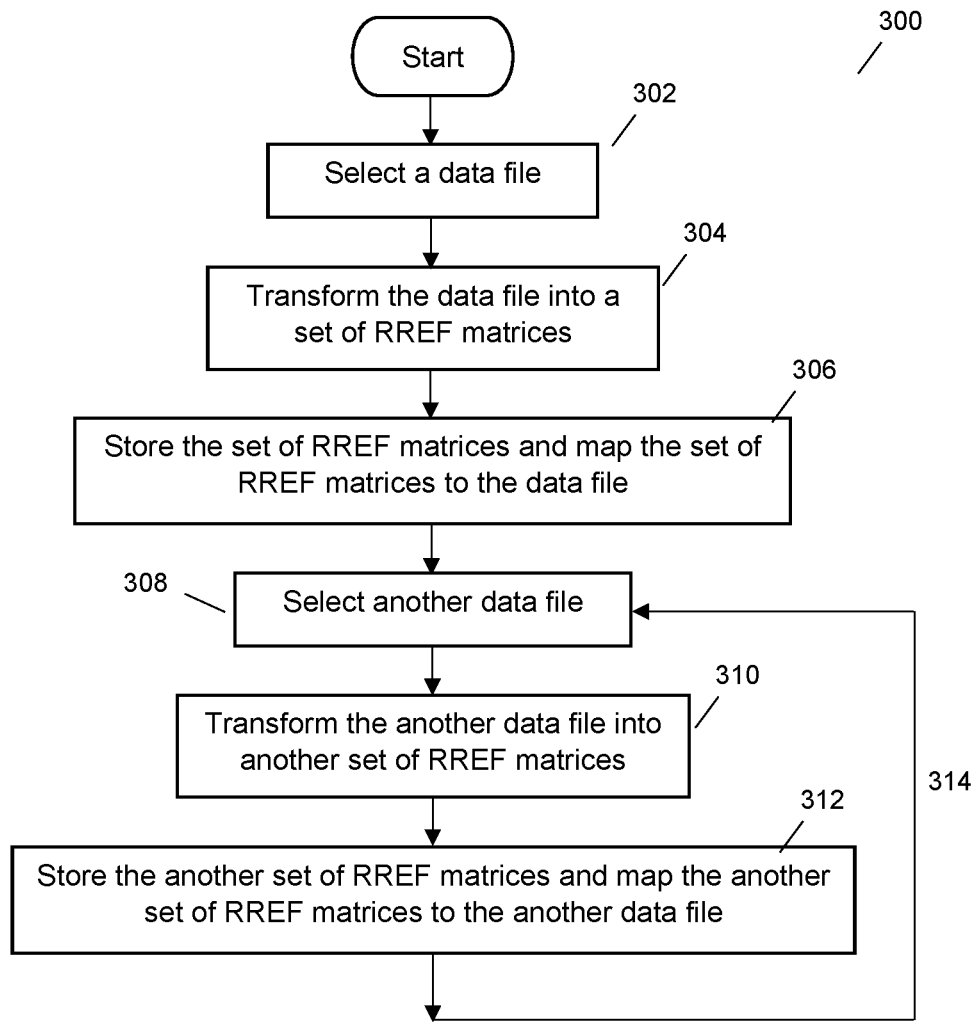
FIG. 3 illustrating a flow diagram for transforming a series of data files into sets of reduced row echelon form (RREF) matrices in accordance with embodiments of the invention.

FIG. 3 illustrates process 300 for mapping a series of data files obtained from a host machine to their corresponding sets of RREF matrices in accordance with embodiments of the invention whereby process 300 may be implemented in system 120. It is assumed that system 120 is communicatively connected to host machine 110 thereby allowing system 120 to capture all data being transmitted on the bus system of host machine 110 or stored in the memory of host machine 110.

Process 300 begins at step 302 with process 300 selecting a data file from the series of data files stored within the host machine or being transmitted/received by the host machine. Process 300 then transforms the data file into a set of RREF matrices at step 304. At step 306, process 300 then stores the set of RREF matrices and maps the set of RREF matrices to the data file.

Process 300 then proceeds to select another data file at step 308. The data file is then transformed into another set of RREF matrices at step 310. At step 312, process 300 then stores the another set of RREF matrices and maps the set of RREF matrices to the another data file. Process 300 then proceeds to step 308. The process 314 of selecting another data file, transforming the data file and mapping the data file repeats itself until all the data files in the series of data files have been processed by process 300. Process 300 then ends.

Figure 4:
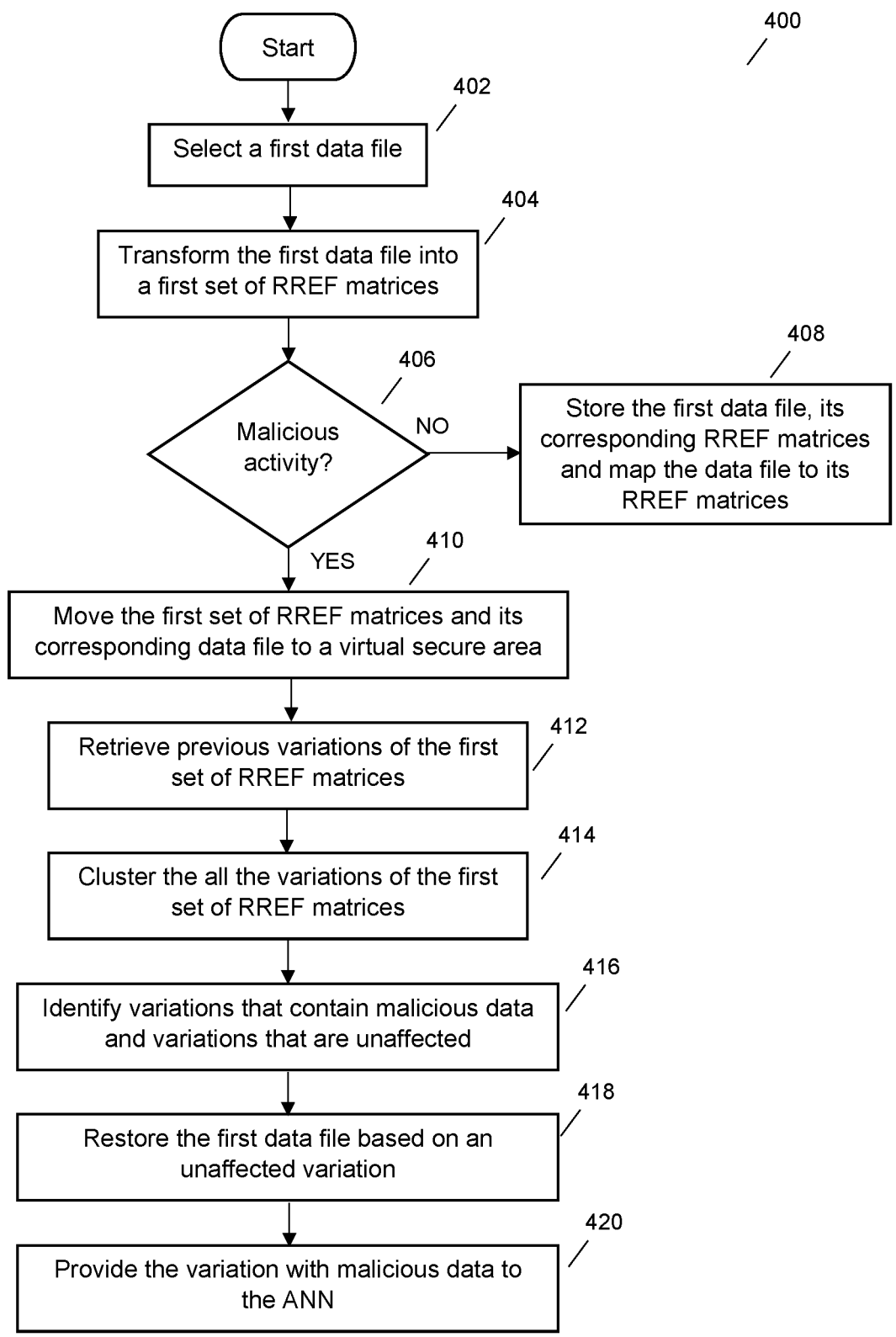
FIG. 4 illustrating a flow diagram for securing data files in accordance with embodiments of the invention.

FIG. 4 illustrates process 400 for securing data files obtained from a host machine in accordance with embodiments of the invention whereby process 400 may be implemented by the modules in system 120. Process 400 begins at step 402 whereby an altered data file, i.e. a first data file, is retrieved from the host machine by process 400. This altered data file may comprise a variation of a data file that was previously stored and processed by process 300 (as described in FIG. 3). Process 400 then transforms the first data file into a first set of RREF matrices at step 404. At step 406, process 400 determines whether the first set of RREF matrices comprise malware or malicious activity. If process 400 determines that the first set of RREF matrices does not comprise malware, process 400 proceeds to step 408 whereby the first data file and its corresponding sets of RREF matrices are stored along with its corresponding mapping.

Conversely, if process 400 determines at step 406 that the first set of RREF matrices is associated with malicious activity, process 400 proceeds to step 410. At step 410, the first set of RREF matrices along with its mapped first data file is moved to a virtual secure area. Process 400 then proceeds to retrieve all variations of the first set of RREF matrices from its memory at step 412. The variations of the first set of RREF matrices along with the first set of RREF matrices are then clustered by process 400. This takes place at step 414. Based on the outcome of the clustering that took place at step 414, at step 416, process 400 identifies variations of the first set of RREF matrices (that were previously considered to be safe) that contain malicious activity and also identifies variations of the first set of RREF matrices that do not contain malicious activity. The first data file is then restored by process 400 at step 418 based on a first set of RREF matrices that does not contain malicious activity. At step 420, variations of the first set of RREF matrices that contain malicious activity are then provided by process 400 to the trained ANN for further processing as described in the previously sections.

Numerous other changes, substitutions, variations and modifications may be ascertained by the skilled in the art and it is intended that the present invention encompass all such changes, substitutions, variations and modifications as falling within the scope of the appended claims.

The invention claimed is:

1. A system for securing a series of data files, the system comprising:
a processing unit; and
a non-transitory media readable by the processing unit, the media storing instructions that when executed by the processing unit causes the processing unit to:
retrieve, using a transformation module, an altered data file from the system and transform the altered data file into an altered set of reduced row echelon form (RREF) matrices, wherein the transformation module comprises sets of RREF matrices that have been transformed from the series of data files, and wherein the series of data files have been mapped to the sets of RREF matrices;
map, using the transformation module, the altered data file to the altered set of RREF matrices, and provide the altered set of RREF matrices to a trained artificial neural network (ANN) module;
determine, using the trained ANN module, if the altered set of RREF matrices comprise malicious activity, whereby when it is determined that the altered set of RREF matrices comprise malicious activity, the altered set of RREF matrices and the altered data file are moved to a virtual secure area in a memory of the system;
retrieve, using a backpropagation module, variations of the altered set of RREF matrices from the sets of RREF matrices;
cluster, using a clustering module, the retrieved variations of the altered set of RREF matrices and the altered set of RREF matrices to identify sets of RREF matrices that contain malicious activity;
provide, using the clustering module, the identified sets of RREF matrices that contain malicious activity to the trained ANN module, whereby the trained ANN module is configured to identify a type of malicious activity associated with the identified sets of RREF matrices; and
secure, using the clustering module, data files mapped to the identified sets of RREF matrices that contain malicious activity according to the type of malicious activity associated with the data files as identified by the trained ANN module.

2. The system according to claim 1, wherein the instructions to transform, using the transformation module of the altered data file into the altered set of RREF matrices further comprises instructions for directing the processing unit:
convert, using the transformation module, the altered data file into an intermediate data frame, wherein the intermediate data frame comprises a multimedia data frame or a character-based data frame;
transform, using the transformation module, the intermediate data frame into a set of matrices using a first linear function; and
transform, using the transformation module, the set of matrices into the altered set of RREF matrices.

3. The system according to claim 1 whereby the media further comprises instructions for directing the processing unit to:
provide, using the clustering module sets of RREF matrices that do not contain malicious activity to the transformation module, whereby the media further comprises instructions for directing the processing unit to convert, using the transformation module, the provided sets of RREF matrices into data files, and map the data files to the provided sets of RREF matrices.

4. The system according to claim 1 whereby the variations of the altered set of RREF matrices comprise related sets of RREF matrices that have differing timestamps.

5. The system according to claim 1, whereby the mapping of the series of data files to the sets of RREF matrices, and the mapping of the altered data file to the altered set of RREF matrices is done for each data file or each altered data file by applying a hashing function to an address of the data file and to a contextual metadata layer of the data file, and using a result of this hashing function to link each data file to each sets of RREF matrices.

6. The system according to claim 1 whereby the media further comprises instructions for directing the processing unit to:
train, using the trained ANN module, the neural network in the ANN module based on the identified sets of RREF matrices that contain malicious activity.

7. The system according to claim 1, wherein the instructions to transform the series of data files into the sets of RREF matrices by the transformation module comprises instructions for directing the processing unit to:
  convert, using the transformation module, each of the data files into an intermediate data frame, wherein the intermediate data frame comprises a multimedia data frame or a character-based data frame;
  transform, using the transformation module, the intermediate data frame into a set of matrices using a first linear function; and
  transform, using the transformation module, the set of matrices into a set of RREF matrices.

8. A method for securing a series of data files using a system comprising a transformation module that comprises sets of reduced row echelon form (RREF) matrices that have been transformed from the series of data files, whereby the series of data files have been mapped to the sets of RREF matrices, the method comprising the steps of:
  retrieving, using the transformation module, an altered data file from the system and transforming the altered data file into an altered set of RREF matrices;
  mapping, using the transformation module, the altered data file to the altered set of RREF matrices, and providing the altered set of RREF matrices to a trained artificial neural network (ANN) module;
  determining, using the trained ANN module, if the altered set of RREF matrices comprise malicious activity, whereby when it is determined that the altered set of RREF matrices comprise malicious activity, the altered set of RREF matrices and the altered data file are moved to a virtual secure area in a memory of the system;
  retrieving, using a backpropagation module, variations of the altered set of RREF matrices from the sets of RREF matrices;
  clustering, using a clustering module, the retrieved variations of the altered set of RREF matrices and the altered set of RREF matrices to identify sets of RREF matrices that contain malicious activity;
  providing, using the clustering module, the identified sets of RREF matrices that contain malicious activity to the trained ANN module, whereby the trained ANN module is configured to identify a type of malicious activity associated with the identified sets of RREF matrices; and
  securing, using the clustering module, data files mapped to the identified sets of RREF matrices that contain malicious activity according to the type of malicious activity associated with the data files as identified by the trained ANN module.

9. The method according to claim 8, wherein the transforming of the altered data file into the altered set of RREF matrices comprises:
  converting, using the transformation module, the altered data file into an intermediate data frame, wherein the intermediate data frame comprises a multimedia data frame or a character-based data frame;
  transforming, using the transformation module, the intermediate data frame into a set of matrices using a first linear function; and
  transforming, using the transformation module, the set of matrices into the altered set of RREF matrices.

10. The method according to claim 8 whereby the method further comprises the step of:
  providing, using the clustering module, sets of RREF matrices that do not contain malicious activity to the transformation module, whereby the transformation module is further configured to convert the provided sets of RREF matrices into data files, and map the data files to the provided sets of RREF matrices.

11. The method according to claim 8 whereby the variations of the altered set of RREF matrices comprise related sets of RREF matrices that have differing timestamps.

12. The method according to claim 8, whereby the mapping of the series of data files to the sets of RREF matrices, and the mapping of the altered data file to the altered set of RREF matrices is done for each data file or each altered data file by applying a hashing function to an address of the data file and to a contextual metadata layer of the data file, and using a result of this hashing function to link each data file to each sets of RREF matrices.

13. The method according to claim 8 whereby the method further comprises the step of training the neural network in the ANN module based on the identified sets of RREF matrices that contain malicious activity.

14. The method according to claim 8, wherein the transforming of the series of data files into the sets of RREF matrices by the transformation module comprises the steps of:
  converting, using the transformation module, each of the data files into an intermediate data frame, wherein the intermediate data frame comprises a multimedia data frame or a character-based data frame;
  transforming, using the transformation module, the intermediate data frame into a set of matrices using a first linear function; and
  transforming, using the transformation module, the set of matrices into a set of RREF matrices.

* * * * *